(No Model.) 2 Sheets—Sheet 1.

H. McPHERSON.
HAY RAKE AND LOADER.

No. 492,825. Patented Mar. 7, 1893.

Witnesses
Ray Hutchins
Peter A. Malberg

Inventor
Horace McPherson By
Thos H Hutchins his atty (No Model.) 2 Sheets—Sheet 2.
H. McPHERSON.
HAY RAKE AND LOADER.
No. 492,825. Patented Mar. 7, 1893.
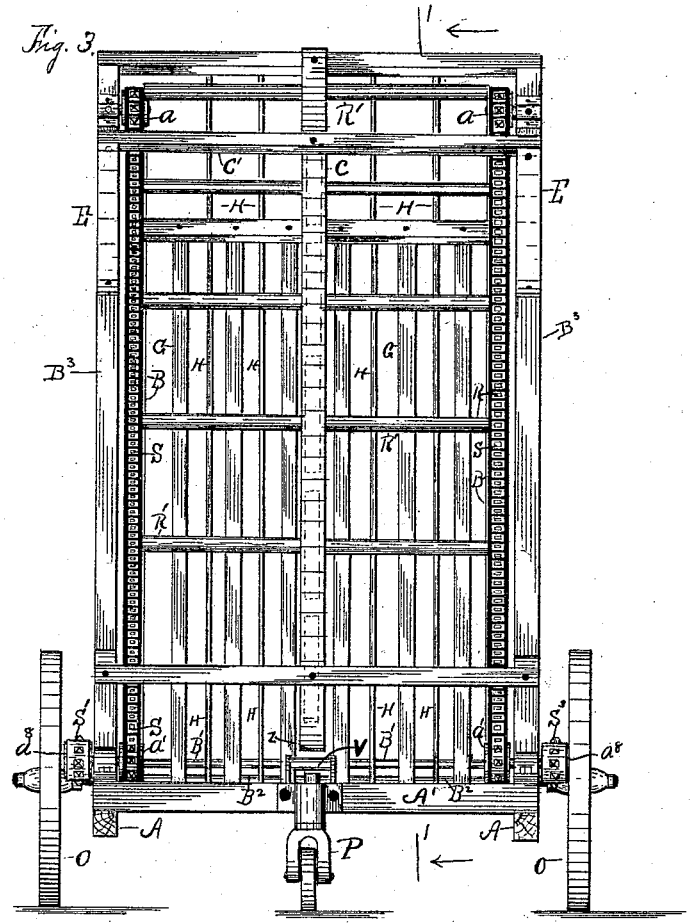
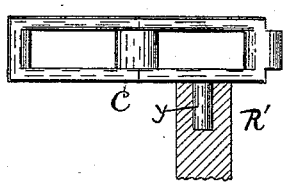
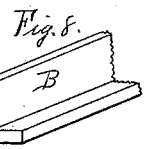
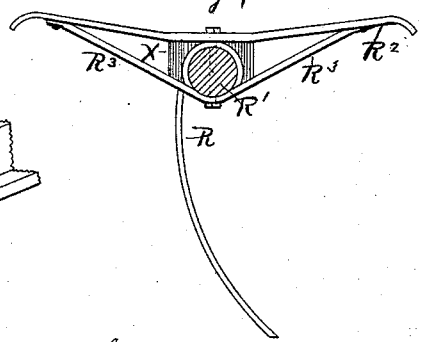
Witnesses
Ray Hutchins
P. A. Malberg
Inventor
Horace McPherson By
Thos H Hutchins his atty

UNITED STATES PATENT OFFICE.

HORACE McPHERSON, OF CRETE, ILLINOIS.

HAY RAKE AND LOADER.

SPECIFICATION forming part of Letters Patent No. 492,825, dated March 7, 1893.

Application filed July 16, 1892. Serial No. 440,277. (No model.)

*To all whom it may concern:*

Be it known that I, HORACE MCPHERSON, a citizen of the United States of America, residing at Crete, in the county of Will and State of Illinois, have invented certain new and useful Improvements in Hay Rakes and Loaders, of which the following is a specification, reference being had therein to the accompanying drawings and the letters of reference thereon, forming a part of this specification, in which—

Figure 1:
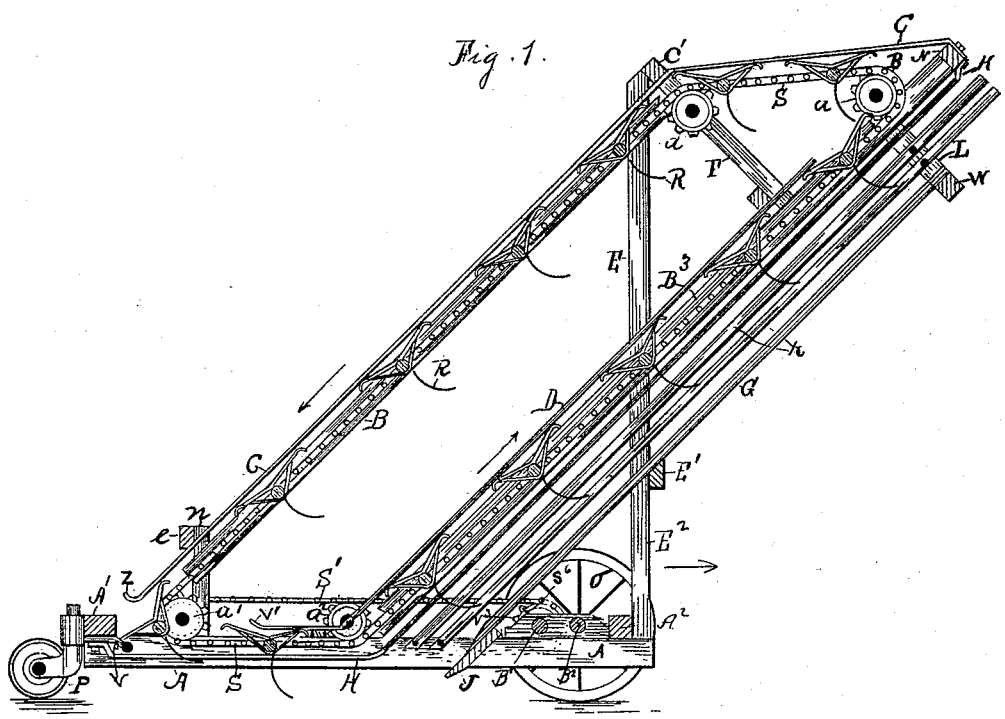
Figure 2:
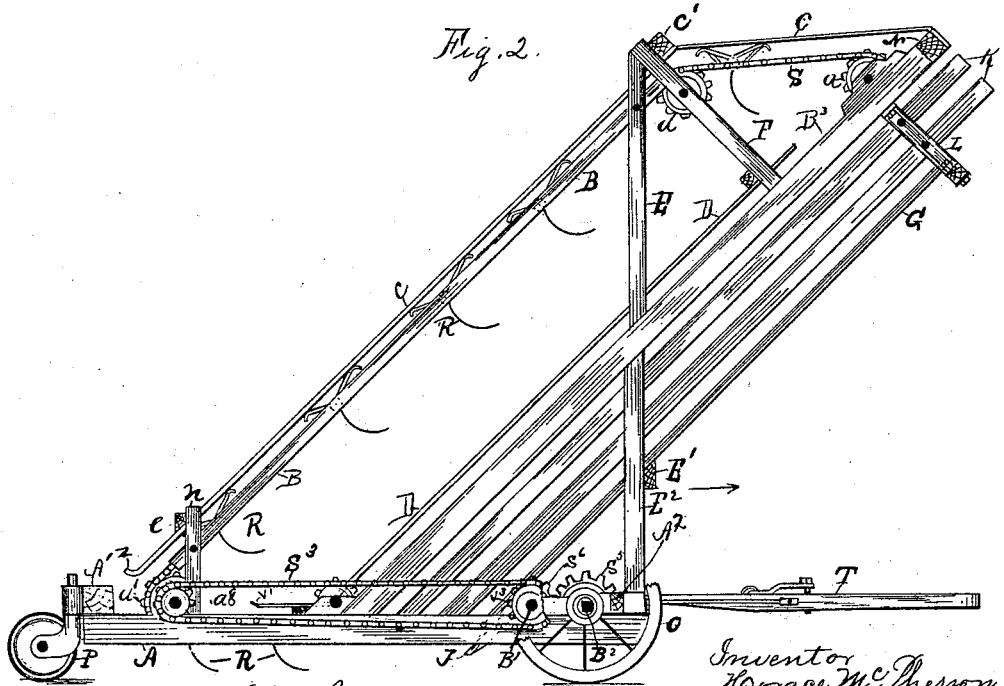

Figure 1. is a vertical section of the machine taken on line 1 of Fig. 3 looking in the direction of the arrow. Fig. 2 is a side elevation of the machine. Fig. 3. is a rear elevation of the machine, the rakes being omitted. Fig. 4 is a perspective view of a section of one of the rake heads, and a face view of a rake tooth, showing the manner of securing the rake teeth to the rake head. Fig. 5. is a plan of a section of one of the sprocket chains, showing a laterally extending stud for entering the end of a rake head journaled thereon. Fig. 6 is a perspective view of a section of one of the upper sprocket chain guides. Fig. 7. is a cross section of a rake head and a side view of a rake tooth secured thereto and Fig. 8 is a perspective view of a section of another form of the upper sprocket chain guides.

This invention relates to certain improvements in a hay rake and loader which improvements are fully set forth and explained in the following specification and claim.

Referring to the drawings A represents the two side beams or sills of the bed frame of the machine secured together by means of the two cross beams A'. and A²., and supported at their forward end on the axle B² of the traveling wheels O, and at the rear end on the caster wheel P, and said bed frame is provided at its forward end with a tongue T by means of which the machine may be attached to the rear end of a wagon upon which it is to deliver hay.

B and B³ are grooved guide ways for carrying in their grooves a pair of endless sprocket chains S, one at either side of the machine. These sprocket chains are each provided on their inner sides with oppositely arranged integral studs $y$ arranged at regular intervals from each other throughout the length of the sprocket chains, and upon which are pivoted the ends of the rake heads R' in the manner shown particularly in Fig. 5. These rake heads are provided with a series of spring rake teeth R. Each rake head R' is provided with a cross arm R² arranged centrally on its upper side and supported at its outer ends by means of a brace R³ so said arm may hold the rake teeth to their work.

The guides B and B³ are four in number. Two guides are arranged at either side of the machine, the guides B being located above and parallel with the guides B³, and are arranged at an angle with the bed sills of the machine, of about forty-five degrees. The lower ends of the upper guides B are secured to and supported by the posts $n$ resting on the bed sills A, and their upper ends are secured to the posts F which rest on the lower guides B³.

E. E. are brace posts which stand on the lower guides B³ and support and brace the upper ends of the posts F. The lower guides B³ have their lower ends rest on and supported by the sills A, and their upper ends are supported by the posts E², which rest at their lower ends respectively on the forward ends of the beams A.

$a$ $a$ $a'$ $a^2$ are sprocket wheels arranged at the ends of the said guideways for the sprocket chains to pass over, and said endless sprocket chains are driven by said sprocket wheels $a'$.

In order to prevent rotation of the rakes and hold them to their work, and so they will not turn backward their cross arms R² are arranged to pass under guard bars D and C, the upper guard bar C engaging said rake arms as the rakes pass downward, and the lower guard bar D engaging said rake arms as the rakes pass upward. The upper guard bar C has its lower end secured centrally above the machine to the cross beam $e$ secured to the upper ends of the posts $n$, and at its upper end to the cross beams C' and N. The cross beam $c'$ connecting the upper ends of posts F, and the cross beam N connecting the upper ends of the lower guide ways B³. The lower guard bar D is similarly secured in the machine by attaching near each end to cross bars as shown in Fig. 2. As the rakes leave the upper guard bar C their rearwardly extending ends of cross arms R² are consecutively arrested by a stirrup $v$ for the purpose of bringing the forwardly extending ends of cross arms $R^2$ under the lower guard bar D as shown in Fig. 1, by means of which guard bar D the rakes are prevented from turning backward as they are traveling upward with their loads of hay. The lower ends of the guard bars C and D are curved upward at their lower ends as shown at $v'$ and $z$ to facilitate the passage of the rakes from upper guard bar C, to under guard bar D.

G are bars or slats forming a bed upon which the hay rests and moves upward, and are supported by means of the cross bars J, $E'$ and $w$, the said cross beam $w$ being supported by means of the depending arms L secured at their upper ends to the upper ends of the lower guide ways $B^3$.

K are side bars or slats for preventing escape of hay from the sides of the machine, and are secured at their lower ends to the inner sides of the bed beams A, and at their upper ends to the depending arms L, and at their center to the side posts $E^2$.

H is a series of guard rods or bars arranged below the rake heads when they are raking hay and located so the rake teeth pass down between them, and are for the purpose of preventing hay from passing above the rake heads and filling up the machine above the rakes, and assist the rakes in conducting hay to the upper end of the machine. The lower ends of said guard bars H are secured to the under side of the cross bed sill $A'$, and their upper ends are secured to the under side of the cross beam N as shown in Fig. 1.

The axle shaft $B^2$ and the shaft $B'$ pass across the machine and are boxed on bed sills A, and are geared together by means of the gear wheels $S^5$ and $S^6$, so that shaft $B'$ is driven by shaft $B^2$ and the traveling wheels O boxed on axle shaft $B^2$. Shaft $B'$ is provided on each outer end with a sprocket wheel $v^3$ shown in Figs. 1 and 2 carrying the sprocket chains $S'$ and $S^3$ which drive the endless sprocket rake chains S through the medium of sprocket wheels $a'$ and $a^8$, the said sprocket wheels being connected respectively by a short shaft boxed in suitable boxes on sills A, so that sprocket wheels $a'$ may be driven by sprocket wheels $a^8$.

The upper sprocket chain guide B may be constructed as shown in Fig. 8 if desired.

In operation the machine is attached to the rear of a wagon by means of the tongue T, and as the machine is drawn along over the ground the endless sprocket chains with their rakes are driven, and the rakes carry the hay up between the bottom slats or bars G and the guard bars H and delivered to the wagon. The traveling wheels O are intended to be provided with ordinary ratchet hubs so the machine may be turned around. By this construction and arrangement of the rakes and their guides and guards the rakes do not rotate as they are conducted in their path in their circuit, which prevents the rakes from carrying hay down to the foot of the machine as they return, which is the case in machines of this character wherein the rakes are unprovided with means for feathering their teeth and preventing rotation of the rakes.

Having thus described my invention, what I claim as new, and desire to secure by Letters Patent, is as follows, to wit:

In a hay rake and loader the combination of the bed frame A. $A'$. $A^2$., posts $E^2$, F, and $n$ cross beams $e$ $E'$, $c'$, and N., braces E, sprocket chain guides B and $B^3$ arranged parallel with each other and in an oblique position, sprocket chains S for traveling in said guides, rakes comprising the parts R $R'$ $R^2$ $R^3$ journaled at either end on inwardly projecting studs of said chains, guard bar C arranged to engage the cross arms $R^2$ of the rakes in their downward passage, guard bar D arranged to engage said cross arms in their upward passage, sprocket wheels $a$, $a'$, and $a^2$, for carrying said endless chains and their rakes, sprocket wheels $a^8$ respectively connected with the sprocket wheels $a'$ by a shaft journaled in a box between said wheels, guide bars H for preventing material from passing up between the rakes, side bars K, bed bars G for conducting material upward to the discharge end of the machine, stirrup or arm V for engaging the rear ends of cross arms $R^2$ of the rakes and conducting the opposite ends of said arms under guard bar D, axle shaft $B^2$ having the traveling wheels O journaled thereon and having gear wheel $S^5$ secured thereon, shaft $B'$ having gear wheel $S^6$ secured thereon and geared with wheel $S^5$, and having sprocket wheels $v^3$ secured thereon, sprocket chains $S'$ and $S^3$ for connecting sprocket wheels $v^3$ with sprocket wheels $a^8$, and the caster wheel P for supporting the rear end of the machine all arranged to operate substantially as and for the purpose set forth.

HORACE McPHERSON.

Witnesses:
  Thos. H. Hutchins,
  Ray Hutchins.